(12) United States Patent
Robertson, Jr. et al.

(10) Patent No.: US 12,368,834 B2
(45) Date of Patent: Jul. 22, 2025

(54) VEHICLE SENSOR ASSEMBLY

(71) Applicant: Ford Global Technologies, LLC, Dearborn, MI (US)

(72) Inventors: Michael Robertson, Jr., Garden City, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 18/066,399

(22) Filed: Dec. 15, 2022

(65) Prior Publication Data

US 2024/0205381 A1    Jun. 20, 2024

(51) Int. Cl.
| | |
|---|---|
| *H04N 13/25* | (2018.01) |
| *B60W 60/00* | (2020.01) |
| *G01S 17/931* | (2020.01) |
| *H04N 13/194* | (2018.01) |
| *H04N 13/243* | (2018.01) |
| *H04N 23/51* | (2023.01) |
| *G01S 17/86* | (2020.01) |

(52) U.S. Cl.
CPC ............ *H04N 13/25* (2018.05); *B60W 60/00* (2020.02); *H04N 13/194* (2018.05); *H04N 13/243* (2018.05); *H04N 23/51* (2023.01); *B60W 2420/403* (2013.01); *G01S 17/86* (2020.01); *G01S 17/931* (2020.01)

(58) Field of Classification Search
CPC .... H04N 13/25; H04N 13/194; H04N 13/243; H04N 23/51; B60W 60/00; B60W 2420/403; G01S 17/86; G01S 17/931; B60R 11/00; B60R 11/04; B60R 2011/004; B60R 2011/005; B60S 1/54

See application file for complete search history.

(56) References Cited

U.S. PATENT DOCUMENTS

| | | | |
|---|---|---|---|
| 10,399,106 | B2 | 9/2019 | Dudar |
| 2015/0070503 | A1 | 3/2015 | Kraeling et al. |
| 2016/0379067 | A1 | 12/2016 | May et al. |
| 2017/0096106 | A1* | 4/2017 | Higuchi ................. H04N 7/181 |
| 2017/0278312 | A1 | 9/2017 | Minster et al. |
| 2017/0313288 | A1* | 11/2017 | Tippy ..................... B60S 1/566 |
| 2018/0009418 | A1* | 1/2018 | Newman .................. B08B 5/02 |
| 2020/0177872 | A1* | 6/2020 | Herman ................. H04N 23/56 |

(Continued)

FOREIGN PATENT DOCUMENTS

| | | |
|---|---|---|
| DE | 102020207444 A1 | 12/2021 |
| WO | 2018150661 A1 | 8/2018 |

OTHER PUBLICATIONS

Matthews, "How to choose a digital camera," 2021. (Year: 2021).*

(Continued)

*Primary Examiner* — Aniss Chad
*Assistant Examiner* — Stephanie T Su
(74) *Attorney, Agent, or Firm* — Frank A. MacKenzie; Brooks Kushman P.C.

(57) ABSTRACT

A vehicle includes a vehicle body and an optical sensor supported by the vehicle body and defining a field-of-view. The vehicle includes a transparent shield in the field-of-view, the transparent shield having an outer surface. The vehicle includes a camera facing the outer surface of the transparent shield.

17 Claims, 5 Drawing Sheets

(56) References Cited

U.S. PATENT DOCUMENTS

2021/0025983 A1* 1/2021 Patil .................. G02B 27/0006
2021/0179025 A1* 6/2021 Li ......................... H04N 23/52

OTHER PUBLICATIONS

SiccaDania Group, "Nozzle Cam," 2022. (Year: 2022).*
Partsmax, "What's the Difference Between the "Front Bumper" and "Front Fascia" of a Car?" 2022. (Year: 2022).*
Utmel, "What is an Optical Sensor?" 2021. (Year: 2021).*
SiccaDania Group, "Nozzle Cam" (Year: 2022)*

* cited by examiner

VEHICLE SENSOR ASSEMBLY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
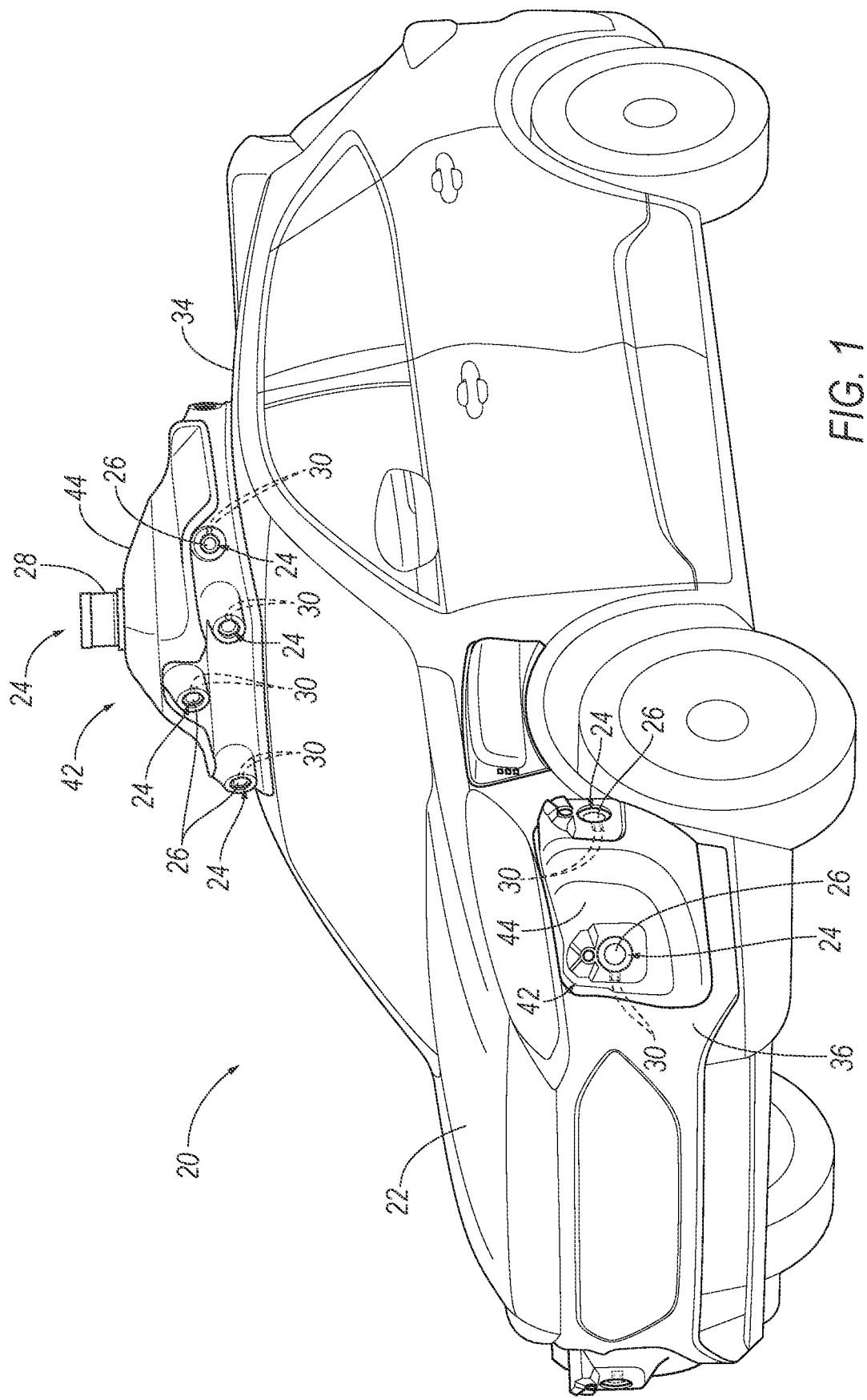
FIG. 1 is a perspective view a vehicle with optical sensors.

A vehicle includes a vehicle body. The vehicle includes an optical sensor supported by the vehicle body and defining a field-of-view. The vehicle includes a transparent shield in the field-of-view, the transparent shield having an outer surface. The vehicle includes a camera facing the outer surface of the transparent shield.

The vehicle body may include a roof, and the optical sensor may be supported by the roof.

The vehicle may include a housing supported by the roof, the optical sensor and the camera supported by the housing.

The vehicle body may include a front facia, and the optical sensor may be supported at the front facia.

The camera may be supported vehicle-forward of the optical sensor.

The camera may have a first resolution, and the optical sensor may have a second camera having a second resolution that is higher than the first resolution.

The vehicle may include a second camera supported by the vehicle body, the camera and the second camera configured to collectively capture stereoscopic images of the outer surface of the transparent shield.

The vehicle may include a computer in communication with the optical sensor, the computer having a processor and a memory storing instructions to actuate at least one of a vehicle brake system or a vehicle propulsion system based on information from the optical sensor.

The vehicle may include a computer in communication with the camera, the computer having a processor and a memory storing instructions to actuate a shield cleaning system based on information from the camera.

The camera may be wirelessly in communication with the computer.

The vehicle may include a shield cleaning system having an air nozzle positioned to direct air across the transparent shield.

The camera may by supported within the air nozzle.

An assembly includes an optical sensor configured to collect data for autonomous vehicle operation, the optical sensor having a field-of-view. The assembly includes a transparent shield in the field-of-view of the optical sensor, the transparent shield having an outer surface. The assembly includes a camera facing the outer surface of the optical sensor.

The camera may have a first resolution and the optical sensor may be a second camera having a second resolution higher than the first resolution.

The assembly may include a housing, the optical sensor and the camera supported by the housing.

The assembly may include a second camera facing the outer surface of the optical sensor, the camera and the second camera configured to collectively capture stereoscopic images.

The assembly may include a shield cleaning system having an air nozzle positioned to direct air across the transparent shield, and wherein the camera is supported within the air nozzle.

The assembly may include a computer in communication with the camera, the computer having a processor and a memory storing instructions executable by the processor to actuate a shield cleaning system based on information from the camera.

With reference to the Figures, wherein like numerals indicate like parts throughout the several views, a vehicle 20 having a body 22 and an optical sensor 24 supported by the body 22 are shown. The optical sensor 24 defines a field-of-view. The vehicle 20 includes a transparent shield 26 in the field-of-view. The transparent shield 26 has an outer surface 28. The vehicle 20 includes a camera 30 facing the outer surface 28 of the transparent shield 26. Image data from the camera 30 may be monitored, e.g., by a computer 32, to detect dirt, water, etc., on the outer surface 28 of the transparent shield 26.

With reference to FIG. 1, the vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 includes a vehicle frame and the body 22. The vehicle frame and the body 22 may be of a unibody construction in which the frame is unitary with the body 22, including frame rails, pillars, roof rails, etc. As another example, the frame and the body 22 may have a body-on-frame construction also referred to as a cab-on-frame construction in which the body 22 and the frame are separate components, i.e., are modular, and the body 22 is supported on and affixed to the frame. Alternatively, the frame and the body 22 may have any suitable construction. The frame and the body 22 may be of any suitable material, for example, steel, aluminum, and/or fiber-reinforced plastic, etc. The body 22 may include a roof 34 that extends along a top of the vehicle 20, e.g., over a passenger cabin of the vehicle 20. The body 22 may include a front facia 36 at a forward most end of the body 22.

The vehicle 20 includes a propulsion system 38 (see FIG. 5) that generates force to move the vehicle 20, e.g., in a forward or reverse direction. The propulsion system 38 may include one or more of an internal combustion engine, electric motor, hybrid engine, etc. The propulsion system 38 is in communication with and receives input from the computer 32 and/or a human operator. The human operator may control the propulsion system 38 via, e.g., an accelerator pedal.

The vehicle 20 includes a braking system 40 (see FIG. 5) that resists motion of the vehicle 20 to thereby slow and/or stop the vehicle 20. The braking system 40 may include friction brakes such as disc brakes, drum brakes, band brakes, and so on; regenerative brakes; any other suitable type of brakes; or a combination. The braking system 40 is in communication with and receives input from the computer 32 and/or a human operator. The human operator may control the braking system 40 via, e.g., a brake pedal.

The vehicle 20 includes a steering system 41 (see FIG. 5) that controls turning of wheels of the vehicle 20, e.g., toward a right or left of the vehicle 20. The steering system 41 may include a rack-and-pinion system with electric power-assisted steering, a steer-by-wire system, e.g., such as are known, or any other suitable system. The steering system 41 is in communication with and receives input from a steering wheel and/or the computer 32.

The vehicle 20 can include a system or systems for autonomously or semi-autonomously operating the vehicle 20, e.g., an advanced driver assist system ADAS for speed control, lane-keeping, etc. As another example, the computer 32 may operate the propulsion system 38, the steering system 41, and/or the braking system 40 of the vehicle 20 with limited and/or no input from a human operator.

Figure 2:
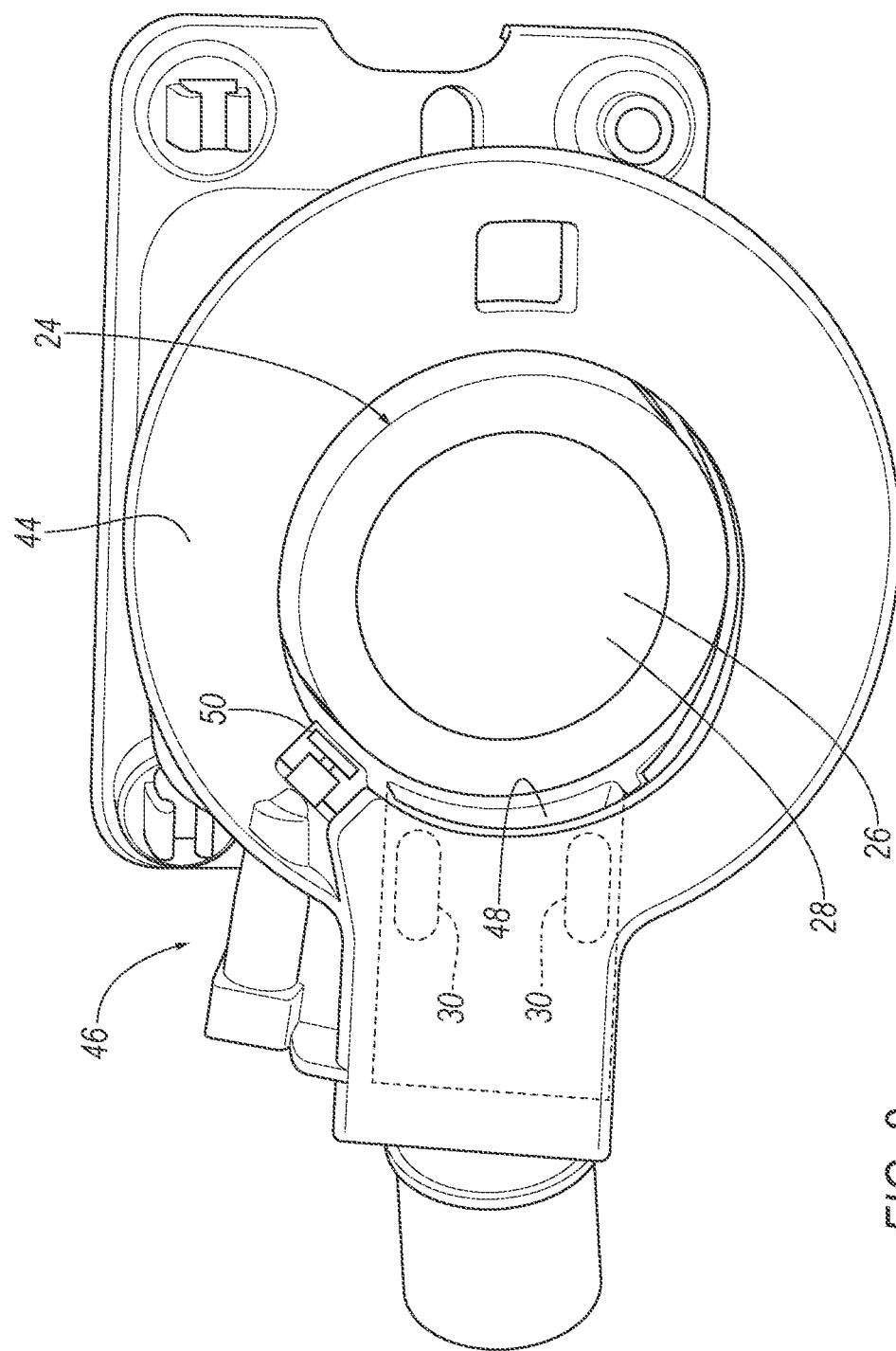
FIG. 2 is a perspective view of an optical sensor and cameras directed towards a transparent shield in a field-of-view of the optical sensor.
Figure 3:
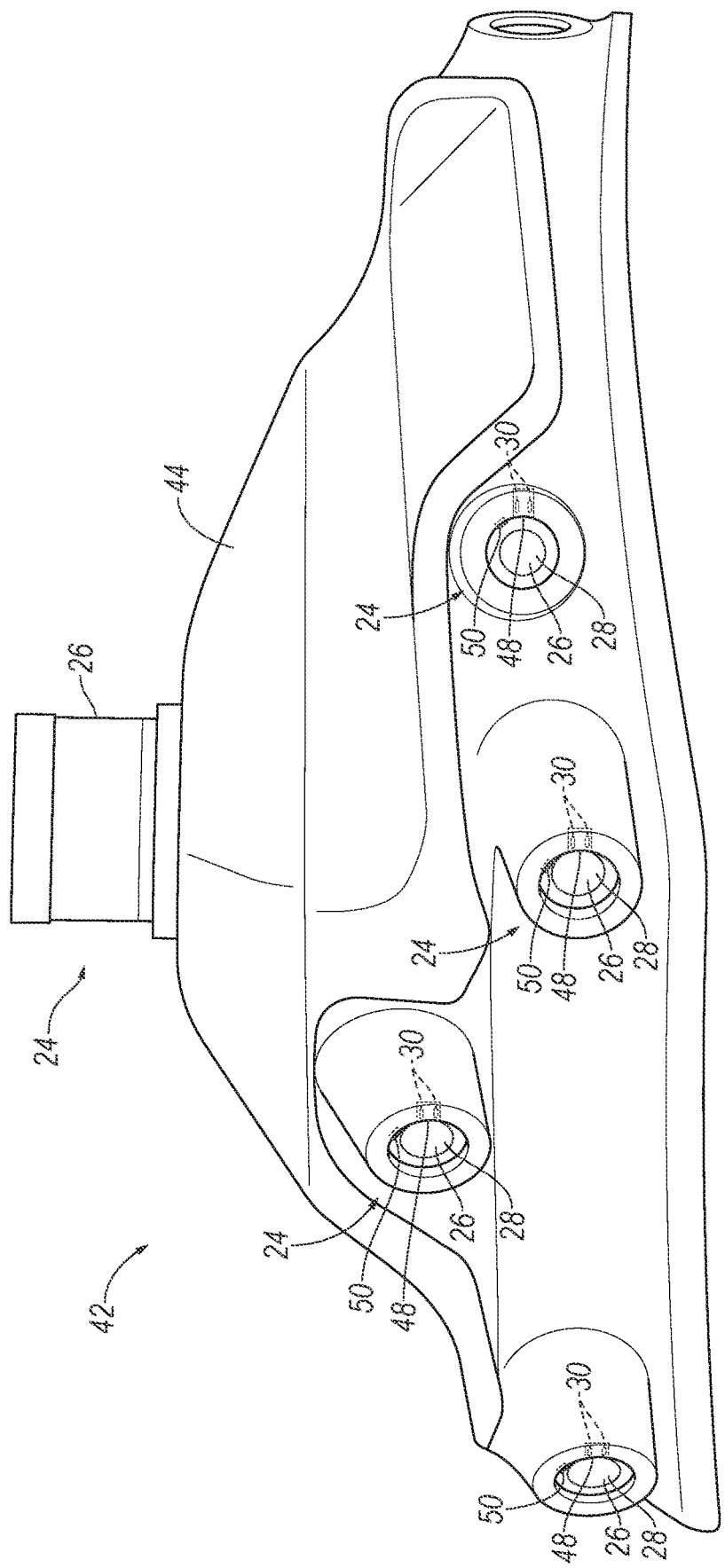
FIG. 3 is a perspective view of a sensor assembly that includes a plurality of optical sensors and cameras directed towards transparent shields in fields-of-view of the optical sensors.

With reference to FIGS. 1-3, the system or systems for autonomously or semi-autonomously operating the vehicle 20 includes one or more optical sensors 24. The optical sensors 24 may be components of sensor assemblies 42, e.g., of the advanced driver assist system. In additional to the one or more optical sensors 24, the sensor assembly 42 may include other sensors, such as radar, sonar, etc., for providing data to autonomously operate the vehicle 20. The sensor assemblies 42 may be supported by the body 22. For example, the sensor assemblies 42 (and their respective optical sensors 24) may be supported by and fixed to the roof 34, the front facia 36, etc. The sensor assembly 42 may include wired or wireless electrical communication systems for transmitting information collected by the optical sensors 24 and other sensors, e.g., as described below for a communication network 62 of the vehicle 20.

The optical sensors 24 may include a variety of devices such as are known to provide data about a physical object, e.g., to the computer 32 of the vehicle 20. In the context of this disclosure, an object is a physical, i.e., material, item that can be represented by physical phenomena, e.g., light or other electromagnetic waves, etc., detected by the optical sensors 24. Example objects include other vehicles, lane markings, street signs, pedestrians, etc. The optical sensors 24 may include Light Detection and Ranging (LIDAR) sensors that provide relative locations, sizes, and shapes of objects surrounding the vehicle 20. The optical sensors 24 may alternatively or additionally include cameras, e.g., front view, side view, etc., providing images from an area surrounding the vehicle 20.

Each optical sensor 24 has a field-of-view. The field-of-view is an area detectable by the respective optical sensor 24. Specifically, the field-of-view is the three-dimensional area from which the optical sensor 24 can detect an image. For example, the field-of-view of a camera or LIDAR sensor may be bounded between upper and lower vertical limits and between left and right lateral limits. The field-of-view extends between the upper and lower vertical limits and the left and right lateral limits for a detection distance in a facing direction of the respective optical sensor 24. One optical sensor 24 may have a first field-of-view and a second optical sensor 24 may have a second field-of-view. The first field-of-view may be different than the second field-of-view. The first field-of-view and the second field-of-view may partially or fully overlap. The field-of-views of two or more optical sensors 24 may collectively define an three-dimensional view that surrounds the vehicle 20.

The optical sensors 24 are configured to collect data for autonomous vehicle operation. In other words, data collected by the optical sensors 24 is of sufficient quality and quantity to enable speed control, lane-keeping, etc., e.g., by the advanced driver assist system. For example, the optical sensors 24 may collect data at a threshold resolution, a threshold refresh rate, etc.

The sensor assembly 42 may include a housing 44 that supports and protects other components of the sensor assembly 42, e.g., the optical sensors 24, other sensors, the computer 32, etc. The housing 44 may be plastic, or any suitable material. The housing 44 may by supported by the roof 34, the front facia 36, or any suitable structure of the vehicle 20.

One or more transparent shields 26 protect components of the optical sensors 24, e.g., from dirt, water, and other objects. The transparent shield 26 permits light to pass therethrough to the optical sensor 24. The transparent shields 26 are in the field-of-views of the optical sensors 24. In other words, the transparent shields 26 are positioned such that light passes therethrough is detectable by the respective optical sensor 24. One transparent shield 26 may be in in a first field-of-view of one of the optical sensors 24, and another transparent shield 26 may be in in a second field-of-view of another of the optical sensors 24.

The transparent shield 26 may be a lens 54, e.g., the transparent shield 26 may focus light onto the optical sensor 24. The transparent shield 26 may be formed of glass, plastic or other suitable transparent material. The transparent shield 26 may be supported by the respective optical sensor 24, e.g., as a component of the optical sensor 24. The transparent shield 26 may be supported by the housing 44. Each transparent shield 26 may include an inner surface that faces the respective optical sensor 24 and the outer surface 28 that faces away from the optical sensor 24. For example, one transparent shield 26 may include a first outer surface 28 and another transparent shield 26 may include a second outer surface 28. The inner surface may be isolated from ambient air. The outer surface 28 is not isolated from ambient air, e.g., the outer surface 28 may be exposed to ambient air.

The vehicle 20 includes a shield cleaning system 46 to clean the outer surfaces 28 of the transparent shields 26. The shield cleaning system 46 may include a compressor, a filter, air supply lines, and air nozzles 48. The compressor, the filter, and the air nozzles 48 are fluidly connected to each other i.e., fluid can flow from one to the other in sequence through the air supply lines. The compressor increases the pressure of a gas by reducing a volume of the gas or by forcing additional gas into a constant volume. The compressor may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type. The filter removes solid particulates such as dust, pollen, mold, dust, and bacteria from air flowing through the filter. The filter may be any suitable type of filter, e.g., paper, foam, cotton, stainless steel, oil bath, etc. The air supply lines extend from the compressor to the filter and from the filter to the air nozzles 48. The air supply lines may be, e.g., flexible tubes. The air nozzles 48 are positioned to direct air across the transparent shields 26. For example, one air nozzle 48 may be aimed at the outer surface 28 of one transparent shield 26 and another air nozzle 48 may be aimed at the second outer surface 28 of the second transparent shield 26.

The shield cleaning system 46 may include a reservoir, a pump, valves, liquid supply lines, and liquid nozzles 50. The reservoir, the pump, and the liquid nozzles 50 are fluidly connected to each other i.e., fluid can flow from one to the other. The shield cleaning system 46 may distribute washer fluid stored in the reservoir to the liquid nozzles 50. Washer fluid is any liquid stored in the reservoir for cleaning. The washer fluid may include solvents, detergents, diluents such as water, etc. The reservoir may be a tank fillable with liquid, e.g., washer fluid for window cleaning. The reservoir may be disposed in a front of the vehicle 20 (e.g., in an engine compartment forward of the passenger cabin), in the housing 44, or any suitable position. The reservoir may store the washer fluid only for supplying cleaning the transparent shields 26 or also for other purposes, such as supply to clean a windshield of the vehicle 20. The pump may force the washer fluid through the liquid supply lines to the liquid nozzles 50 with sufficient pressure that the washer fluid sprays from the liquid nozzles 50. The pump is fluidly connected to the reservoir. The pump may be attached to or disposed in the reservoir. Each valve is positioned and operable to control fluid flow from the pump to one of the liquid nozzles 50. Specifically, fluid from the liquid supply line from the pump must flow through one of the valves to reach the respective liquid supply line providing fluid to the respective liquid nozzle. The valves control flow by being actuatable between an open position permitting flow and a closed position blocking flow from the incoming to the outgoing of the liquid supply lines. The valves can be solenoid valves. As a solenoid valve, each valve includes a solenoid and a plunger. Electrical current through the solenoid generates a magnetic field, and the plunger moves in response to changes in the magnetic field. The solenoid moves the plunger between a position in which the valve is open and a position in which the valve is closed. The liquid supply lines extend from the pump to the liquid nozzles 50. The liquid supply lines may be, e.g., flexible tubes. Each liquid nozzle is fixedly positioned to eject liquid onto the transparent shield 26 in the field-of-view of the respective optical. The liquid nozzles 50 may be supported by the housing 44, the body 22 panels of the vehicle 20, or any suitable structure.

One or more cameras 30 are aimed facing the outer surfaces 28 of the transparent shields 26. In other words, the outer surfaces 28 of the transparent shields 26 are in the field-of-views of the cameras 30. The cameras 30 may be supported by the housing 44, the body 22, or any suitable structure. The camera 30 may be supported within the air nozzle 48, e.g., aimed outward in a same direction that air flows from the air nozzle 48. The one or more camera 30 may be supported vehicle-forward of the respective optical sensor 24, e.g., and aimed vehicle-rearward the outer surfaces 28 of the transparent shields 26. A pair of the cameras 30, e.g., a first camera 30 and a second camera 30, may both face the same the outer surface 28 of the same transparent shield 26 and may be configured to collectively capture stereoscopic images. In other words, image data from the pair of the cameras 30 may be collectively analyzed, e.g., by the computer 32, to determine characteristic of objects in the images, such as a depth of the object, etc.

Figure 4:
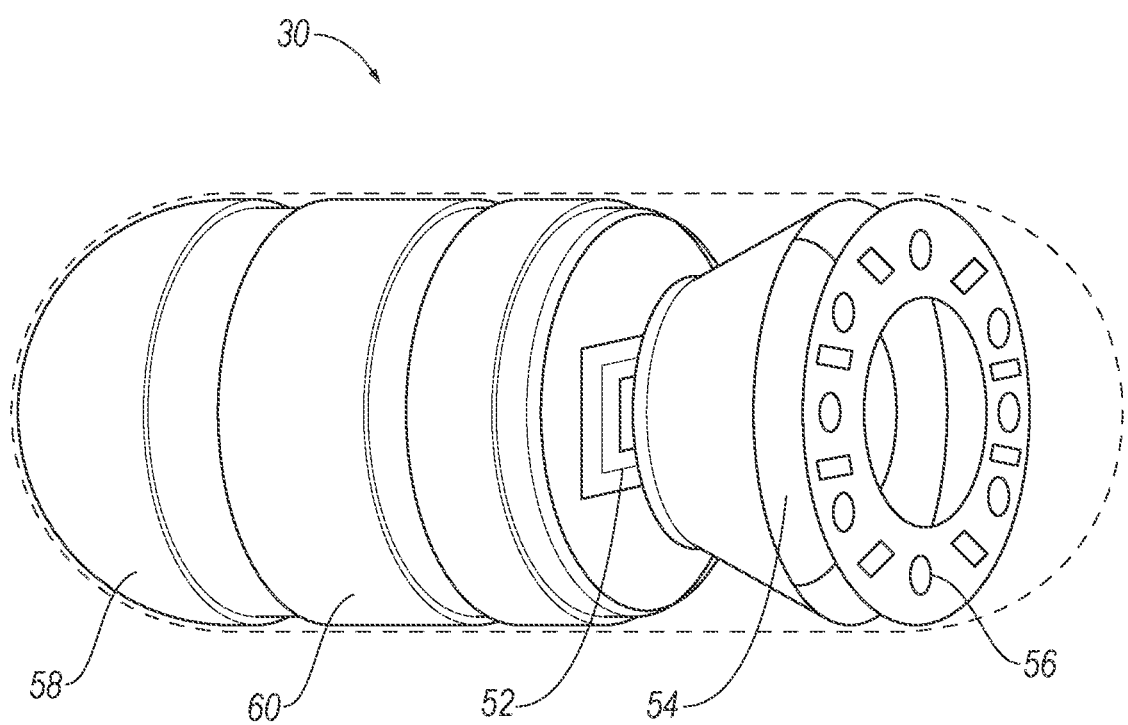
FIG. 4 is a perspective view of internal components of the camera.

With reference to FIG. 4, each camera 30 may include an image sensor 52, a lens 54, a light 56, an antenna 58, and/or a battery 60. The image sensor 52 detects light and generates electric information based on the detected light. The image sensor 52 may be, for example, a charge-coupled device (CCD) or an active-pixel sensor (CMOS sensor). The lens 54 focus light on the image sensor 52. The lens 54 may be glass or any suitable material. The light 56 provides light detectable by the image sensor 52 and may be aimed in a same direction. The light 56 may include a light emitting diode (LED) or any other suitable structure for converting electrical energy into light. The antenna 58 enables wireless transmission of the image information generated by the image sensor 52, e.g., via Bluetooth, Wifi, etc. Accordingly, the camera 30 may wirelessly be in communication with the computer 32. The battery 60 stores electricity of operation of the camera 30. The battery may include any suitable chemistry, e.g., LiPo, NiCad, LiMH, etc. The battery may include a capacitor or any suitable structure.

The camera 30 aimed at the outer surface 28 of at least one of the transparent shields 26, e.g., the image sensor 52 of such camera, has a resolution that is lower than the camera of the optical sensor 24. For example, the camera of the optical sensor 24 may have a resolution of 3840×2160 pixels and the camera 30 aimed at the outer surface 28 may have a resolution of 352×240 pixels. The higher resolution image data of the camera of the optical sensor 24 can be used, e.g., by the computer 32, for autonomously or semi-autonomously operating the vehicle 20 and the lower resolution image data of the camera 30 aimed at the outer surface 28 of the transparent shield 26 protecting the optical sensor 24 can be used to monitor the condition of the outer surface 28.

Figure 5:
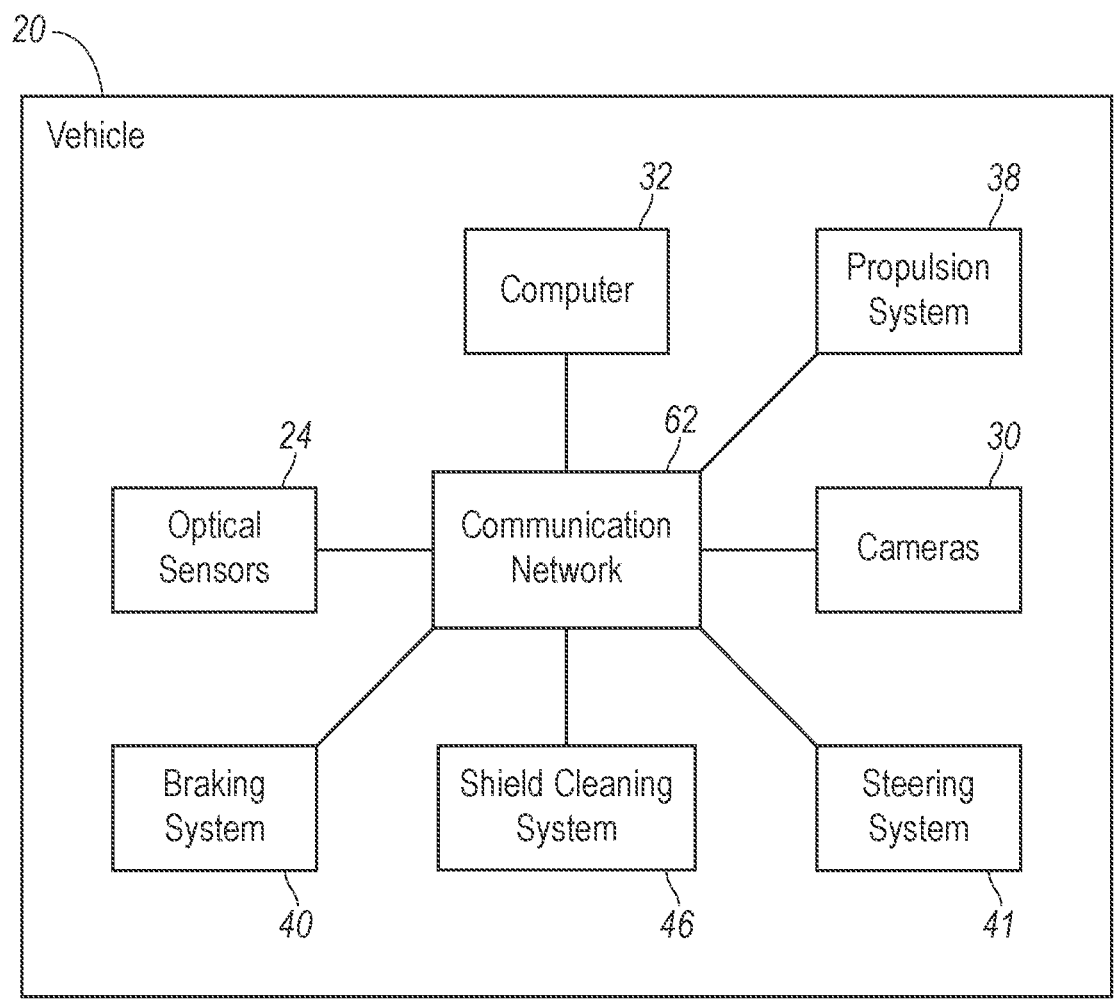
FIG. 5 is a block diagram of components of the vehicle.

With reference to FIG. 5, the vehicle 20 may include the computer 32 to autonomously or semi-autonomously operate the vehicle 20 and/or actuate the shield cleaning system 46. The computer 32 is generally arranged for communications on a communication network 62 that can include a bus in the vehicle 20 such as a controller area network (CAN) or the like, and/or other wired and/or wireless mechanisms. In some implementations, communication network 62 can include a network in which messages are conveyed using other wired communication technologies and/or wireless communication technologies e.g., Ethernet, WiFi, Bluetooth, etc. Via the communication network 62, the computer 32 may transmit messages to various devices in the vehicle 20, and/or receive messages (e.g., CAN messages) from the various devices, e.g., the optical sensors 24, the cameras 30, the shield cleaning system 46, the brake system 40, the propulsion system 38, etc. Alternatively or additionally, in cases where the computer 32 comprises a plurality of devices, the communication network 62 may be used for communications between devices represented as the computer 32 in this disclosure.

The computer 32 includes a processor and a memory. The memory includes one or more forms of computer 32 readable media, and stores instructions executable by the processor for performing various operations, processes, and methods, as disclosed herein. For example, the computer 32 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 32 may include an FPGA (Field-Programmable Gate Array) which is an integrated circuit manufactured to be configurable by a user.

Typically, a hardware description language such as VHDL (Very High-Speed Integrated Circuit Hardware Description Language) is used in electronic design automation to describe digital and mixed-signal systems such as FPGA and ASIC. For example, an ASIC is manufactured deployable based on VHDL programming provided pre-manufacturing, whereas logical components inside an FPGA may be configured deployable based on VHDL programming, e.g., stored in a memory electrically connected to the FPGA circuit. In some examples, a combination of processor(s), ASIC(s), and/or FPGA circuits may be included in the computer 32. The memory can be of any type, e.g., hard disk drives, solid state drives, servers, or any volatile or non-volatile media. The memory can store the collected data sent from the sensors.

The computer 32 may be programmed to, i.e., the memory may store instructions executable by the processor to, actuate at least one of the brake system 40, the propulsion system 38, or the steering system 41 based on information from the optical sensor(s) 24. For example, data from one or more of the optical sensors 24 may indicate that a second vehicle is traveling forward of, and in a same lane as, the vehicle 20. The computer 32 may actuate the brake system 40, the steering system 41, and/or the propulsion system 38, e.g., via sending commands through the communication network 62, to maintain a certain distance behind the forward vehicle and maintain a generally centered position between lane markings. The computer 32 may actuate the brake system 40, the steering system, 41, and/or the propulsion system 38 based on information from the optical sensors 24 using conventional algorithms and image processing techniques.

The computer 32 may be programmed to actuate the shield cleaning system 46 based on information from the camera 30 aimed at the outer surface 28 of the transparent shield 26. For example, image data from the camera 30 may indicate liquid droplets, dirt, frost, etc., disposed on the outer surface 28. The computer 32 may command the shield cleaning system 46 based on such indication. For example, the computer 32 may command the shield cleaning system 46 to provide air across the outer surface 28 when liquid drops are indicated and washer fluid when dirt is indicated. The computer 32 may actuate the shield cleaning system 46, and identify objects in the image data from the cameras 30, e.g., using conventional algorithms and image processing techniques.

The adjectives first and second are used throughout this document as identifiers and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
   a vehicle body;
   a sensor assembly including a housing;
   the sensor assembly including an optical sensor interior to the housing, the optical sensor defining a field-of-view;
   the sensor assembly including a transparent shield in the field-of-view, the transparent shield having an outer surface external to the housing; and
   a camera external to the housing and facing the outer surface of the transparent shield.

2. The vehicle of claim 1, wherein the vehicle body includes a roof, and the housing is supported by the roof.

3. The vehicle of claim 2, wherein the camera is supported by the housing.

4. The vehicle of claim 1, wherein the vehicle body includes a front facia, and wherein the optical sensor is supported at the front facia.

5. The vehicle of claim 1, wherein the camera is supported vehicle-forward of the optical sensor.

6. The vehicle of claim 1, wherein the camera has a first resolution, and the optical sensor is a second camera having a second resolution that is higher than the first resolution.

7. The vehicle of claim 1, further comprising a second camera external to the housing, the camera and the second camera being configured to collectively capture stereoscopic images of the outer surface of the transparent shield.

8. The vehicle of claim 1, further comprising a computer in communication with the optical sensor, the computer having a processor and a memory storing instructions to actuate at least one of a vehicle brake system or a vehicle propulsion system based on information from the optical sensor.

9. The vehicle of claim 1, further comprising a computer in communication with the camera, the computer having a processor and a memory storing instructions to actuate a shield cleaning system based on information from the camera.

10. The vehicle of claim 9, wherein the camera is wirelessly in communication with the computer.

11. The vehicle of claim 1, further comprising a shield cleaning system having an air nozzle positioned to direct air across the outer surface of the transparent shield, the camera being in the air nozzle.

12. The vehicle as set forth in claim 1, wherein the transparent shield and the camera are supported by the housing.

13. An assembly, comprising:
   a housing;
   an optical sensor interior to the housing, the optical sensor being configured to collect data for autonomous vehicle operation, the optical sensor having a field-of-view;
   the sensor assembly including a transparent shield supported by the housing and disposed in the field-of-view of the optical sensor, the transparent shield having an outer surface external to the housing; and
   a camera supported by the housing external to the housing, the camera facing the outer surface of the transparent shield.

14. The assembly of claim 13, wherein the camera has a first resolution and the optical sensor is a second camera having a second resolution higher than the first resolution.

15. The assembly of claim 13, further comprising a second camera supported by the housing external to the housing, the second camera facing the outer surface of the transparent shield, the camera and the second camera configured to collectively capture stereoscopic images.

16. The assembly of claim 13, further comprising a shield cleaning system having an air nozzle positioned to direct air across the outer surface of the transparent shield, the camera being in the air nozzle.

17. The assembly of claim 13, further comprising a computer in communication with the camera, the computer having a processor and a memory storing instructions executable by the processor to actuate a shield cleaning system based on information from the camera.

* * * * *